United States Patent [19]

Narayanaswami

[11] Patent Number: 5,734,806
[45] Date of Patent: Mar. 31, 1998

[54] METHOD AND APPARATUS FOR DETERMINING GRAPHICAL OBJECT VISIBILITY

[75] Inventor: Chandrasekhar Narayanaswami, Austin, Tex.

[73] Assignee: International Business Machines Corporation, Armonk, N.Y.

[21] Appl. No.: 665,975

[22] Filed: Jun. 21, 1996

Related U.S. Application Data

[63] Continuation of Ser. No. 278,433, Jul. 21, 1994, abandoned.
[51] Int. Cl.⁶ ............................................. G06T 15/40
[52] U.S. Cl. ................................... 395/122; 395/121
[58] Field of Search ..................... 395/118, 119, 395/121, 132, 133

[56] References Cited

U.S. PATENT DOCUMENTS

| | | | |
|---|---|---|---|
| 4,970,499 | 11/1990 | Ryherd et al. | 395/122 |
| 5,265,199 | 11/1993 | Catlin | 395/122 |
| 5,268,995 | 12/1993 | Diefendorff et al. | 395/122 X |
| 5,357,599 | 10/1994 | Luken | 395/134 |

OTHER PUBLICATIONS

*Computer Graphics Proceedings, Annual Conference Series, 1993*, SIIIGGRAPH 93, Anahiem, California, 1–6 Aug. 1993, "Hierarchical Z–Buffer Visibility", by Ned Green, Michael Kass, Gavin Miller.

*Second Edition Computer Graphics Principles and Practice*, James D. Foley et al, 1990, pp. 649–720.

*Open GL Reference Manual*, The Official Rerference Document for OpenGL, Release 1, pp. 1–53; pp. 270–274.

W. R. Franklin, "Combinatorics of Hidden Surface Algorithms", PhD theis, Center for Research in Computing Technology, Harvard University, Jun. 1978.

Primary Examiner—Phu K. Nguyen
Assistant Examiner—Cliff N. Vo
Attorney, Agent, or Firm—Volel Emile; Andrew J. Dillon

[57] ABSTRACT

An apparatus for rendering visible graphical objects on a display including apparatus for scan converting each graphical object into multiple pixels with depth, each pixel being provided an object identifier of the object, apparatus for storing in memory the depth and object identifier of each pixel which has a pixel depth closer to a viewer than previously stored depth for a given pixel location, and apparatus for rendering graphical objects having object identifiers stored in memory. In addition, a method of rendering visible graphical objects on a display, including the steps of scan converting each graphical object into multiple pixels with depth, each pixel being provided an object identifier of the object, storing in memory the depth and object identifier of each pixel which has a pixel depth closer to a viewer than previously stored depth for a given pixel location, and rendering graphical objects having object identifiers stored in memory.

15 Claims, 7 Drawing Sheets

METHOD AND APPARATUS FOR DETERMINING GRAPHICAL OBJECT VISIBILITY

This is a continuation of application Ser. No. 08/278,433, filed Jul. 21, 1994, now abandoned.

TECHNICAL FIELD

The present invention relates generally to computer graphics systems and more particularly to a method and apparatus for determining graphical object visibility.

BACKGROUND ART

In computer graphics systems, it is desirable to represent a three dimensional graphical picture on a two dimensional display. Typically, such a picture is a construct or image that may be stored in memory as a set of three dimensional objects. For example, an object is typically specified as a set of vertices P(0), P(1), ..., P(n-2), P(n-1), where n is the number of vertices in the object. Each vertex P(i) is typically specified by its location V(i) in a suitable coordinate space and at least one function, such as a color factor, f(V(i)). A color factor is a function evaluated at each vertex that may be displayed later as a color (including a grayscale) variation (such as a light intensity, a thermal characteristic, a humidity factor, etc.). The color factor may be converted to a color and is useful in modelling (such as simple lighting modelling or more complex weather modelling).

When the object is being rendered, pixel representations of the object are calculated and interpolated, including the location or pixel address (typically in X, Y space) and the various functions for that pixel, such as color. As a result, to generate the picture on the display, the objects are then rendered using processes that are typically computationally intensive. As a result, several techniques may be used to reduce the number of objects or pixels being rendered.

For example, a portion of the picture to be represented may fall outside the field of vision provided by a window on the display or by the display itself. In such cases, it may be desirable to clip the picture and the objects comprising the picture as the picture is being generated, thereby reducing computational requirements and increasing rendering speed.

In another example, some objects may fall within the field of vision but are hidden by objects that are in front of them. Several techniques exist for determining which objects are visible so that only those objects or portions of objects that are visible are rendered. Many of these visibility techniques are described in pages 649–720 of "Computer Graphics Principles and Practice", Second Edition, 1990, by Foley, Van Dam, Feiner and Hughes. For example, every graphical object to be rendered may be ordered according to its depth and then rendered from the back object to the front object such that every pixel of every object is rendered. As a result, the pixel values of objects not visible will be rendered and then replaced when the object in front of it is rendered. However, this process requires rendering every pixel of every object and does not handle the case of object that interlock. That is, this process does not handle the case where a first portion of a first object may be behind a second object while a second portion of the first object may be in front of the second object.

DISCLOSURE OF THE INVENTION

The present invention includes an apparatus for rendering visible graphical objects on a display including apparatus for scan converting each graphical object into multiple pixels with depth, each pixel being provided an object identifier of the object, apparatus for storing in memory the depth and object identifier of each pixel which has a pixel depth closer to a viewer than previously stored depth for a given pixel location, and apparatus for rendering graphical objects having object identifiers stored in memory. In addition, the present invention includes a method of rendering visible graphical objects on a display, including the steps of scan converting each graphical object into multiple pixels with depth, each pixel being provided an object identifier of the object, storing in memory the depth and object identifier of each pixel which has a pixel depth closer to a viewer than previously stored depth for a given pixel location, and rendering graphical objects having object identifiers stored in memory.

A further understanding of the nature and advantages of the present invention may be realized by reference to the remaining portions of the specification and the drawings.

BEST MODE FOR CARRYING OUT THE INVENTION

This disclosure describes an improved method and apparatus for determining the visibility of graphical objects. In the preferred embodiment, each object is provided an identifier and is scan converted into pixels with only the X, Y, and Z values determined. A visibility buffer is then used to store which pixels of each object are visible. Once completed, then only those objects or portions thereof that are visible are rendered including performing color, lighting and other interpolative calculations. This process reduces the number of rendering calculations necessary, thereby improving the speed of the rendering process.

Figure 1:
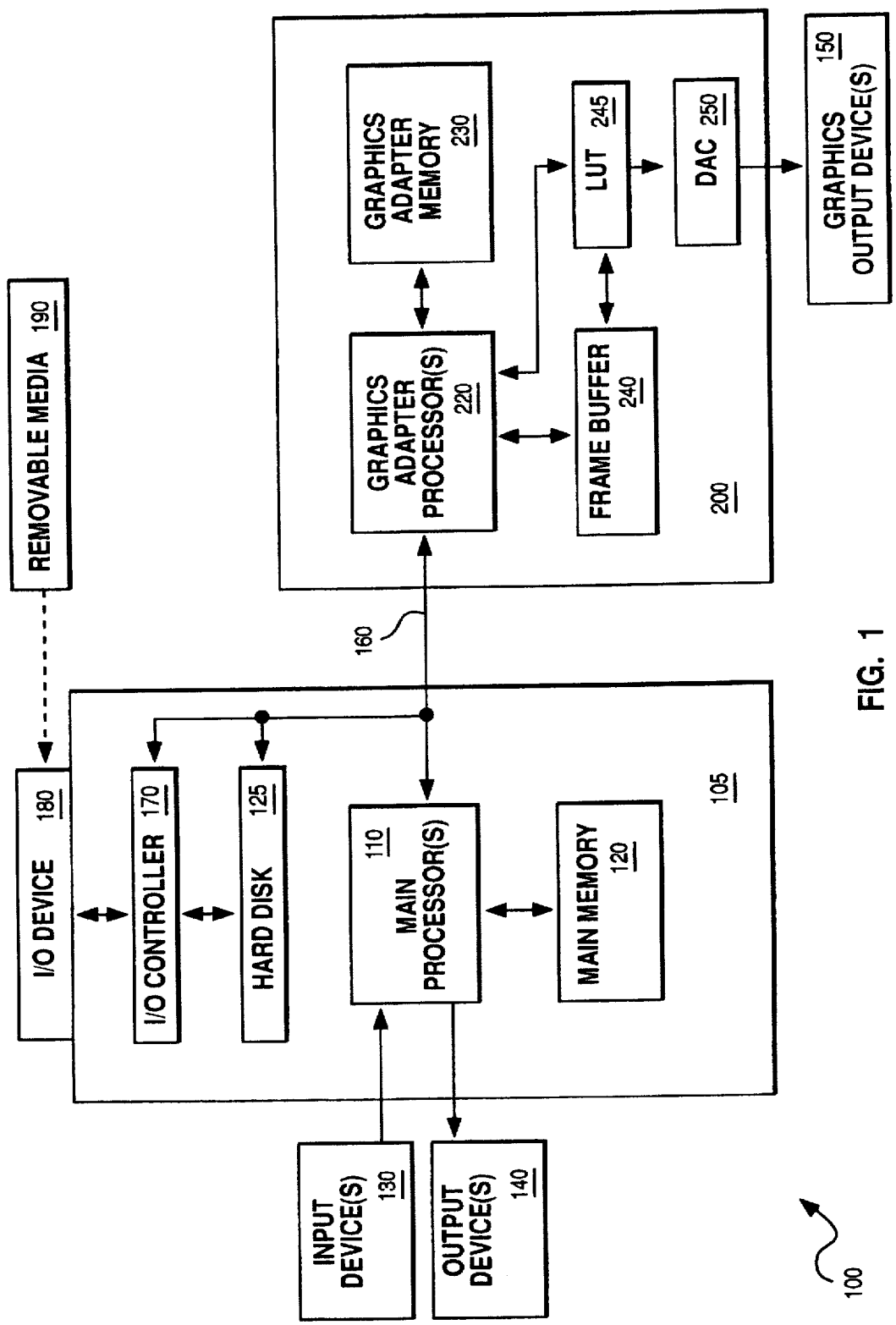
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc—read only memory) drive. Data is read from or written to the removable media by the I/O device under the control of the I/O device controller 170. The I/O device controller communicates with the main processor through across bus 160. Main memory 120, hard disk 125 and removable media 190 are all referred to as memory for storing data for processing by main processor(s) 110.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphics processors 220 may be a pipeline of processors in series, a set of parallel processors, or some combination thereof, where each processor may handle a portion of a task to be completed. Graphic processors 220 may also include specialized rendering hardware for rendering specific types of primitives. Graphics memory 230 is used by the graphics processor(s) to store information being processed, such as received object data, intermediate calculated data (such as a stencil buffer or partially rendered object data), and completed data being loaded into the frame buffer 240. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
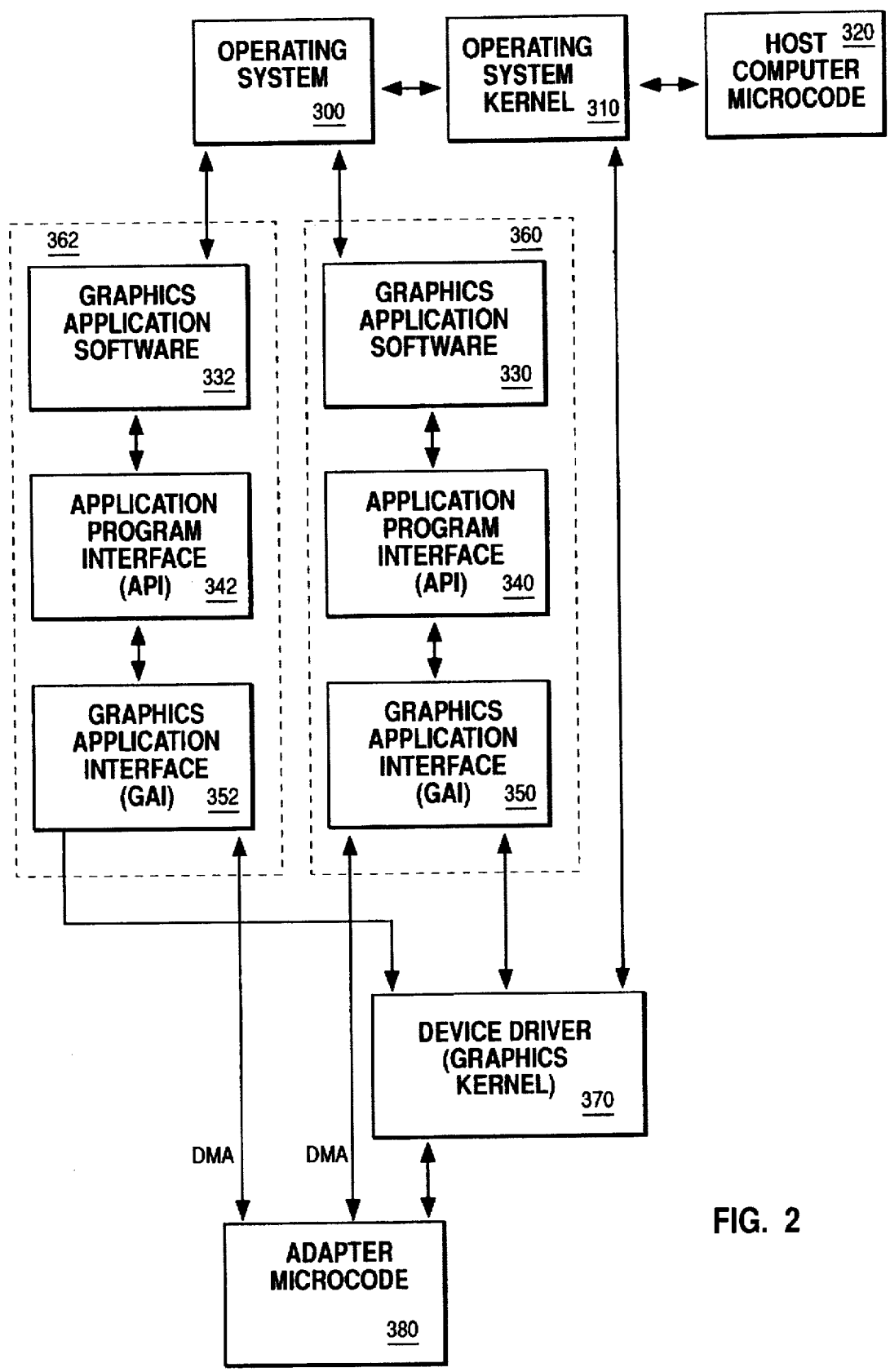
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not inside in the window and the adapter microcode breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective the model, the lighting, etc. are modified.

The techniques of the present invention could be utilized in many locations such as the adapter microcode which is close to the adapter frame buffer. This approach would also be relatively quick and fairly easy to implement. In addition, the present invention could be applied in the graphics application software wherein the rendered image is also stored in system memory either prior to the image being rendered or subsequently by the graphics adapter passing the data back up to the graphics application software. This approach would probably be slower but would allow for utilization of this technique on preexisting graphics adapters. The present invention could also be implemented in hardware in the graphics adapter processor. This approach is extremely quick but may necessitate specialized hardware. As would be obvious to one of ordinary skill in the art, the present invention could be applied in many other locations within the host computer or graphics adapter.

Figure 3:
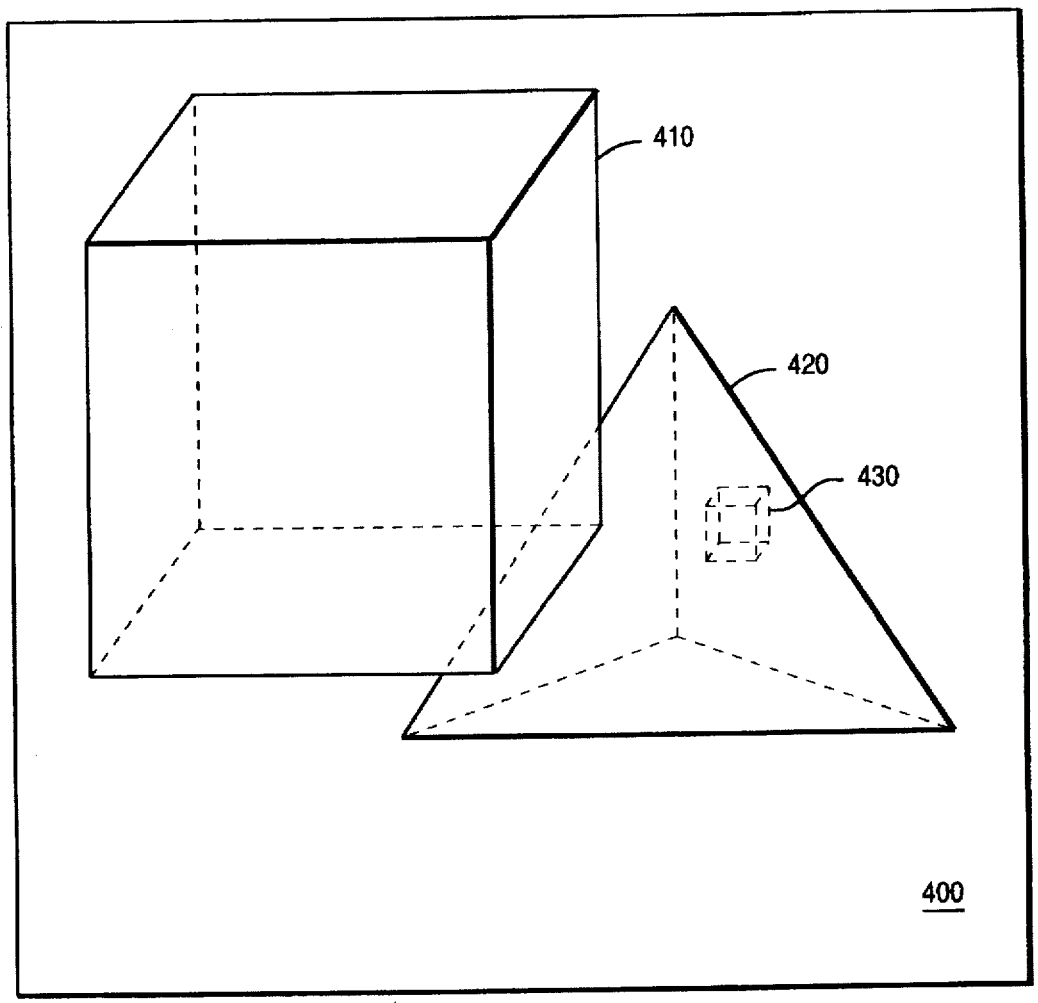
FIG. 3 illustrates a large cube 410, a pyramid 420, and a small cube 430 displayed in a window 400.

Most graphics objects can be described as polygons with a series of vertices. FIG. 3 illustrates a large cube 410, a pyramid 420, and a small cube 430 displayed in a window 400. Only three surfaces of the large cube, one surface of the pyramid, and no surfaces of the small cube are visible. For illustrative purposes, the nonvisible outlines of these hidden surfaces are shown with dotted lines. However, typically neither the hidden surfaces nor their nonvisible outlines are shown in typical three dimensional graphical systems.

Figure 4:
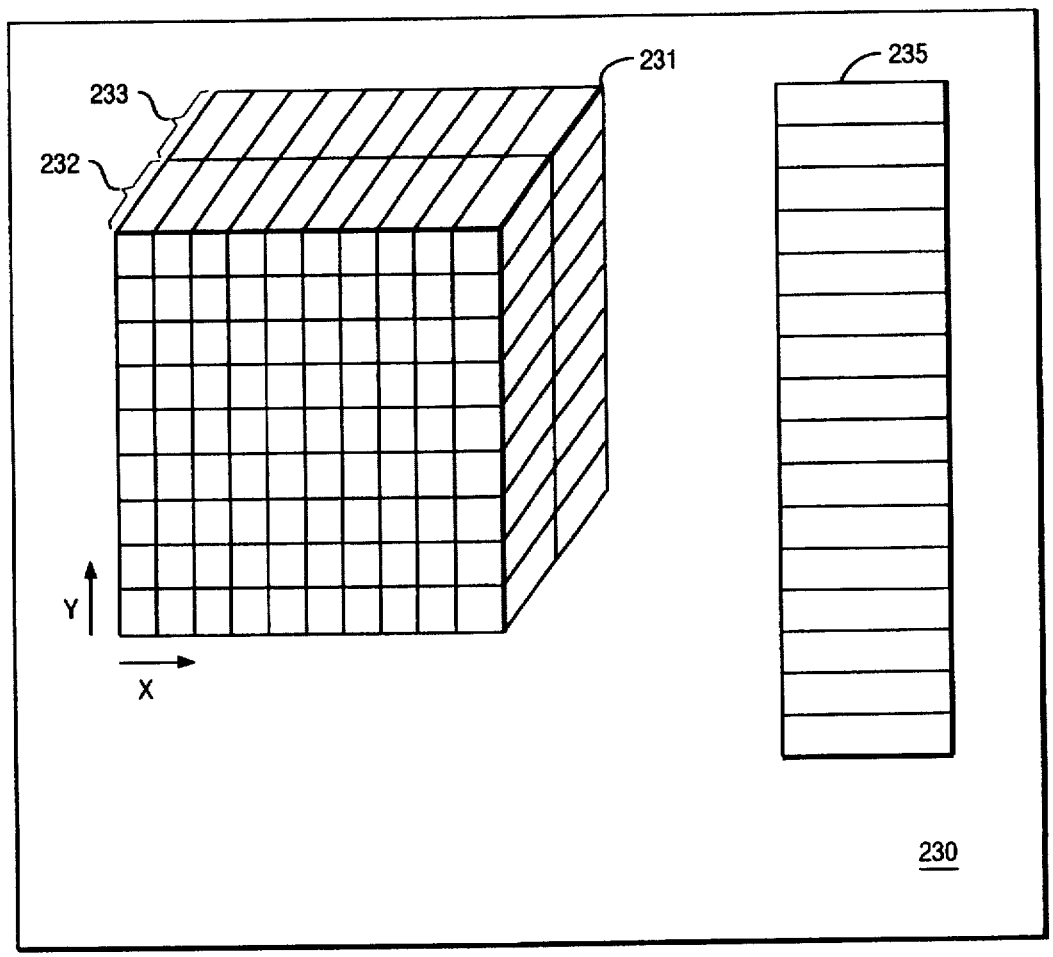
FIG. 4 is a block diagram illustrating data structures used in the graphics adapter memory in the preferred embodiment of the invention.

FIG. 4 is a block diagram illustrating data structures used in the graphics adapter memory 230 in the preferred embodiment of the invention.

An object visibility buffer 231 is used to store identifiers of objects and their relative depth for each pixel location. That is, object visibility buffer 231 has entries corresponding to each pixel location of the frame buffer (or a portion thereof in alternative embodiments) as shown by the X and Y coordinates. Each entry includes an object identifier 232 and a Z value 233. Each entry indicates that the object identified has a Z or depth value stored at that pixel location, indicating that the identified object is visible at that pixel location.

An object visibility list 235 is a list of all object identifiers that have at least one entry in the object identifier buffer thereby indicating that at least one pixel of the identified object is visible.

The following flowcharts will now described how the object visibility buffer and the object list are generated and subsequently used to quickly render visible objects.

Figure 5A:
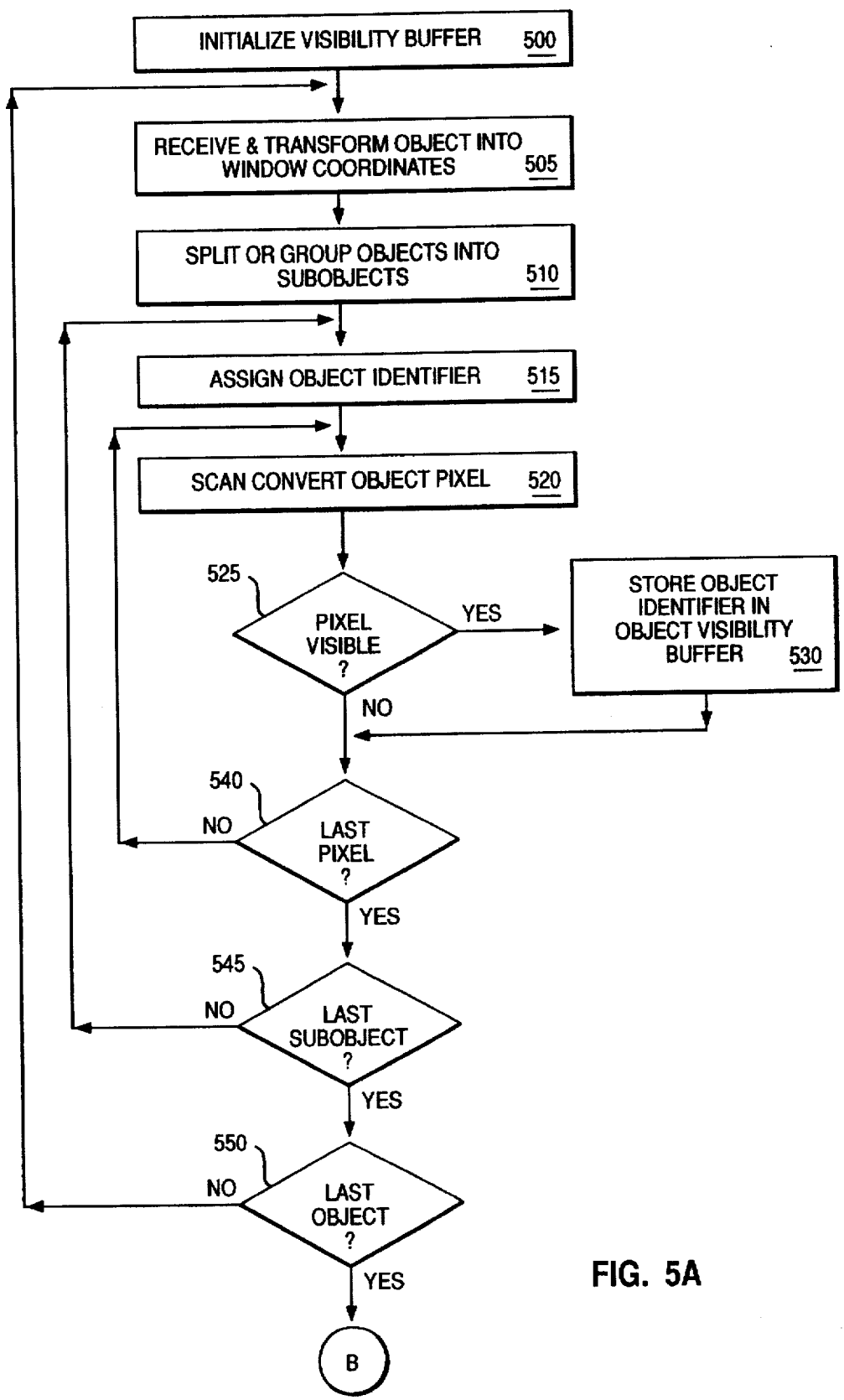
FIG. 5A is a flowchart illustrating how the hidden surfaces and hidden objects may be removed efficiently according to a preferred embodiment of the invention.

FIG. 5A is a flowchart illustrating how the hidden surfaces and hidden objects may be removed efficiently according to a preferred embodiment of the invention.

In a first step 500, the object visibility buffer is initialized by setting each of the depth values to the maximum depth. In addition, the object identifiers may all be set to zero or to some other value that will not be used as an object identifier.

In step 505, an graphical object, sometimes referred to as a primitive, is received and is transformed from its original coordinate system to the window coordinate system. This is typically accomplished for every vertex in the object.

In step 510, the object or primitive may then be split into multiple subobjects, each subobject described below as a separate object. For example, cube 410 of FIG. 3 may be split into six objects, each side of the cube being one object. As a result, if a side is not visible, then that side will not be rendered. In addition, if there are too many objects for the given number of identifiers available, then objects may be grouped into a single object to handle that situation. Furthermore, hashing may be utilized where several objects are hashed to the same identifier. One method of aggregation is to split the viewing volume into several uniform or nonuniform sub-spaces and assigning an identifier to each sub-space. In addition, multiresolution techniques may be used such as when very large numbers of objects are handled. The objects may be grouped as described above, and then visibility is determined for those groups. Once accomplished, each object of the visible groups may then be assigned individual identifiers and the visibility detection process repeated. For each of these alternatives, this step is optional, may be useful in optimizing the present invention.

In step 515, each object is then assigned an identifier. This identifier is used to track whether the object is visible as will be explained below.

In step 520, the object is then scan converted into pixels. That is, each object is converted into pixels with the X, Y and Z values determined. Because of the nature of the present invention, it is not necessary to perform and interpolation of colors, lighting, etc. until the object is determined to be visible.

In step 525, it is determined whether a pixel of the is visible. This is accomplished by using the X and Y values of the pixel to address the object visibility buffer. The Z value of the object pixel is then compared to the Z value stored in the object visibility buffer to determine whether the object pixel is visible or closer to the viewer. If the Z value of the object pixel is less than the Z value in the object visibility buffer, then in step 530, the Z value of the object pixel and the object identifier will both be stored in the object visibility buffer, thereby replacing the values previously stored in the buffer (which could have been the initialized values). Of course, in alternative embodiments, a larger Z value could be considered as closer to the viewer, so the test would be changed to whether the Z value of the object pixel is greater than the Z value in the object visibility buffer.

Processing then proceeds to step 540 where it is determined whether this is the last pixel of the object. If no, then processing returns to step 520 for obtaining the X, Y and Z values of the next pixel of the object. If yes in step 540, then processing proceeds to step 545 where it is determined whether this is the last subobject (if step 510 was used as described above) of a given object. If yes, then processing returns to step 515 for processing the next subobject. If no in step 545, then processing proceeds to step 550 where it is determined whether this is the last object to be processed. If no, then processing returns to step 505 for processing the next object.

If no in step 550, then this portion of the preferred embodiment is concluded as all objects have been processed. At this point, the object visibility buffer contains a identifiers of all objects that are visible and which pixels of those objects are visible. Processing then continues to the process steps described in FIG. 5B below.

Figure 5B:
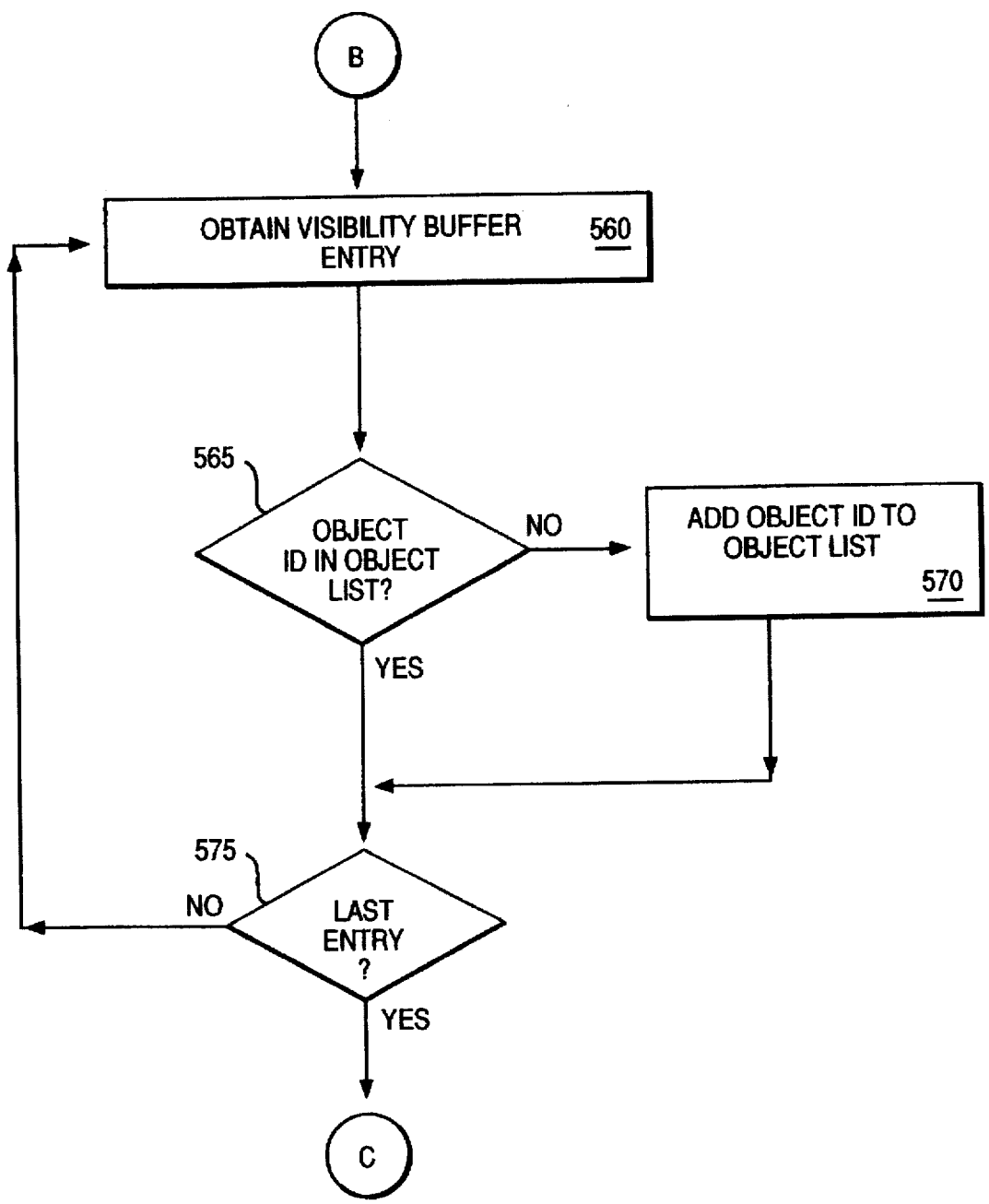
FIG. 5B is a flowchart illustrating object visibility buffer is processed to determine which objects are visible according to a preferred embodiment of the invention.

FIG. 5B is a flowchart illustrating how object visibility buffer is processed to determine which objects are visible according to a preferred embodiment of the invention. In a first step 560, an entry of the object visibility buffer is read to obtain the object identifier stored in that entry. In step 565, it is determined whether the object identifier is already in the object visibility list. If no, then in step 570 the object identifier is added to the list. If yes in step 565 or after processing step 570, processing continues to step 575. In step 575, it is determined whether all entries in the object visibility buffer have been processed. If no, the processing returns to step 560. If yes in step 575, then the object visibility list has been completed. Processing then continues to the process steps described in FIG. 5C below.

With reference to FIG. 3 above, the object visibility list should contain the identifiers of the cube 410 and pyramid 420. However, the identifier for cube 430 should not be in the object visibility list because that object is not visible. If each object had been split into multiple subobjects (i.e. each face of each object a subobject), then only those visible subobjects would be in the object visibility list (i.e. three faces of cube 410 and one face of pyramid 420). As a result, the number of rendering calculations to render the objects has been reduced.

In an alternative embodiment, each entry in the object visibility list may have pointers to each entry in the object visibility buffer that indicates the locations and depth where the object is visible.

Figure 5C:
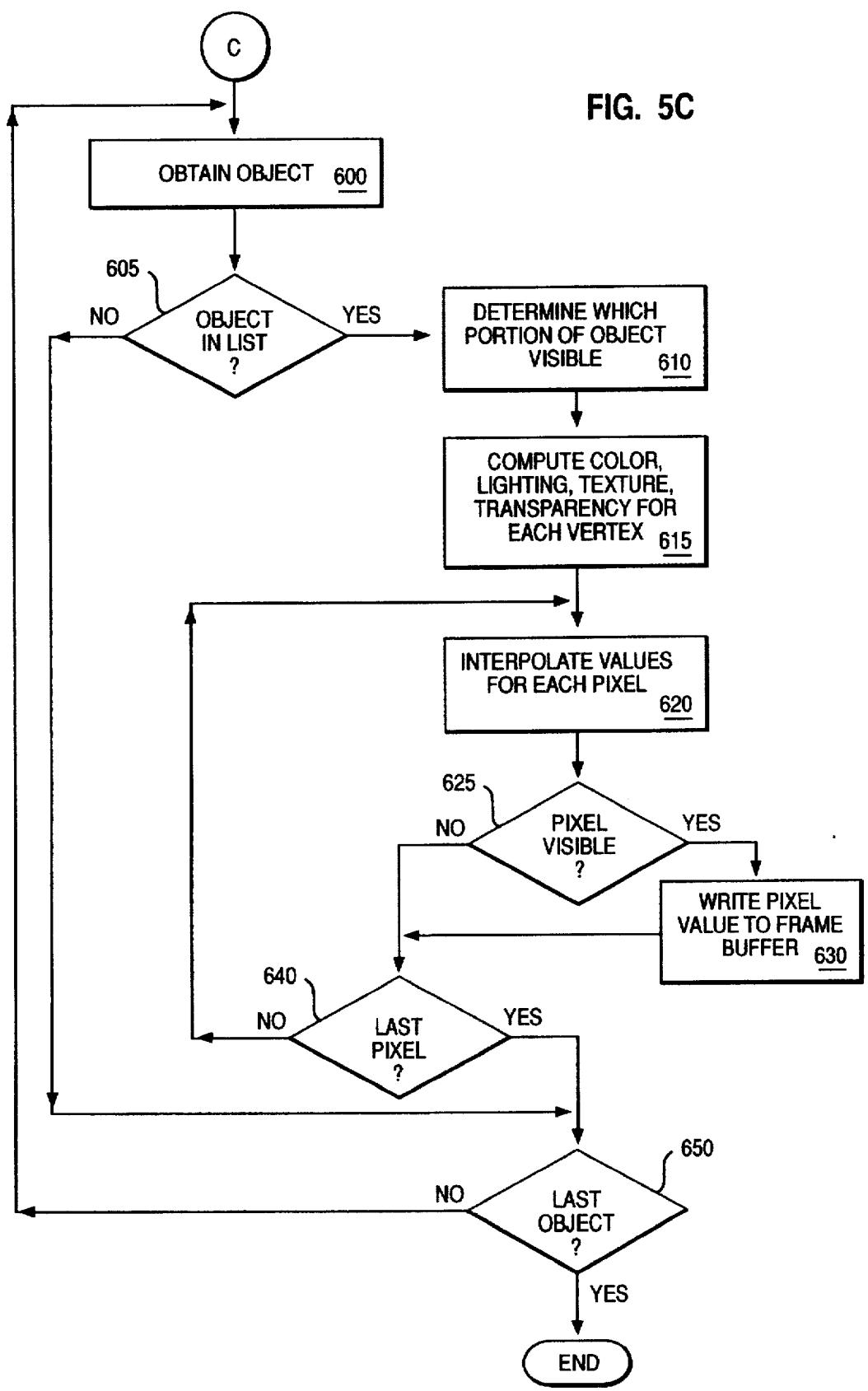
FIG. 5C is a flowchart illustrating rendering of the visible pixels of the visible objects according to a preferred embodiment of the invention.

FIG. 5C is a flowchart illustrating rendering of the visible pixels of the visible objects according to a preferred embodiment of the invention.

In step 600, an object is obtained or retrieved from memory. In step 605, it is determined whether the object exists in the object visibility list. If not, then the object is not rendered and processing returns to step 650 to determine whether this is the last object. If yes in step 605, then processing continues to optional step 610 (or to step 615 if step 610 is not utilized).

In optional step 610, it is determined which portions of the object are visible. This may be accomplished by reviewing the entries of the object visibility buffer to determine which pixels are visible. This step may be useful to remove faces of objects that are not visible such as the back faces of cube 410 and pyramid 420 of FIG. 3. This step may also be useful to remove portions of a face that are not visible such as the portion of the front face of pyramid 420 that are behind cube 410. In either case, only those vertices and pixels that are visible may be processed and additional vertices may be added to reflect the visible portion of the object.

In step 615, the color, lighting, texture, transparency, etc. of each vertex of the object is calculated in order to render the object. As may be observed, this is the first step of the above described process where such computationally intensive calculations are performed.

In step 620, the color, lighting, etc. values for each pixel of the object are interpolated. In step 625, it is determined whether the pixel is visible by checking the object visibility buffer. If yes, the pixel values are stored in the frame buffer. If not in step 625 or after step 630, processing continues to step 640. Please note that step 620 could be performed with step 625 to reduce the number of interpolation calculations.

In step 640, it is determined whether the last pixel in the object has been processed. If not, then processing returns to step 620. If yes in step 640, then processing continues to step 650. In step 650, it is determined whether the last object (or subobject) has been processed. If not, then processing returns to step 600. If yes in step 650, then processing of all the objects has been completed.

In an alternative embodiment, a multipass approach may be used where only a portion of the total number of objects may be handled at a time. That portion of objects may then be rendered as described above, followed by repeating the above described process for another portion of the objects. This may be particularly helpful where the total number of objects outnumbers the number of identifiers and may allow for a smaller object visibility buffer and object visibility list. This may also be helpful in multiprocessor systems where each processors handles a portion of the total number of objects independently from the other processors.

There are many advantages to the present invention. For example, rendering computations, such as lighting, color, texture, etc., need not be performed until it is determined that an object is visible. In addition, the objects may be processed in any order, thereby overcoming some limitations of previous visibility determination techniques. Furthermore, the present invention is flexible to handle many optimization techniques described above including splitting objects, grouping objects, multiresolution processing and other techniques.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for rendering visible a plurality of different graphical objects on a display, comprising:

means for scan converting each graphical object into a plurality of pixels, each pixel having depth information, each pixel being provided an object identifier of said graphical object;

means for storing in an array in memory the depth information and object identifier of each visible pixel after determining which pixel has a pixel depth closer to a viewer than previously stored depth for a given pixel location; and means for thereafter rendering graphical objects having object identifiers stored in said array in said memory, said means for rendering operating after said depth information has been stored and including calculations of color of each pixel, such that calculations of color are not performed unless a pixel has pixel depth closer than previously stored for a given pixel location and is thus visible.

2. The apparatus of claim 1 further comprising means for assigning an identifier for said each graphical object.

3. The apparatus of claim 2 wherein said means for assigning includes grouping multiple graphical primitives into a single graphical object.

4. The apparatus of claim 2 wherein said means for assigning includes means for subdividing a graphical primitive into a plurality of graphical objects, each graphical object being assigned a different object identifier.

5. The apparatus of claim 4 wherein said means for sudividing includes subdividing said graphical primitive by face.

6. A method of rendering visible a plurality of different graphical objects on a display, comprising the steps of:

scan converting each graphical object into a plurality of pixels, each pixel having depth information, each pixel being provided an object identifier of said graphical object;

storing in an array in memory the depth information and object identifier of each visible pixel after determining which pixel has a pixel depth closer to a viewer than previously stored depth for a given pixel location; and thereafter rendering graphical objects having object identifiers stored in said array in said memory, said step of rendering being performed after said determining of depth information and including calculations of color of each pixel, such that calculations of color are not performed unless a pixel has pixel depth closer to a viewer than previously stored for a given pixel location and is thus visible.

7. The method of claim 6 further comprising a step of assigning an identifier for said each graphical object.

8. The method of claim 7 wherein said step of assigning includes grouping multiple graphical primitives into a single graphical object.

9. The method of claim 7 wherein said step of assigning includes subdividing a graphical primitive into a plurality of graphical objects, each graphical object being assigned a different object identifier.

10. The method of claim 9 wherein said step of sudividing includes subdividing said graphical primitive by face.

11. A data processing system comprising:
a memory for storing data to be processed;
a processor for processing data stored in memory; and
a graphics processing apparatus for rendering visible a plurality of different graphical objects on a display, including:
means for scan converting each graphical object into a plurality of pixels, each pixel having depth information, each pixel being provided an object identifier of said graphical object;
means for storing in an array in memory the depth information and object identifier of each visible pixel after determining which pixel has a pixel depth closer to a viewer than previously stored depth for a given pixel location; and
means for thereafter rendering graphical objects having object identifiers stored in said array in said memory, said means for rendering operating after said depth information has been stored and including calculations of color of each pixel, such that calculations of color are not performed unless a pixel has pixel depth closer than previously stored for a given pixel location and is thus visible.

12. The data processing system of claim 11 wherein the graphics processing system further includes means for assigning an identifier for said each graphical object.

13. The data processing system of claim 12 wherein said means for assigning includes grouping multiple graphical primitives into a single graphical object.

14. The data processing system of claim 12 wherein said means for assigning includes means for subdividing a graphical primitive into a plurality of graphical objects, each graphical object being assigned a different object identifier.

15. The data processing system of claim 14 wherein said means for sudividing includes subdividing said graphical primitive by face.

* * * * *